2,940,128
MANUFACTURE OF RUBBER COVERED BALLS

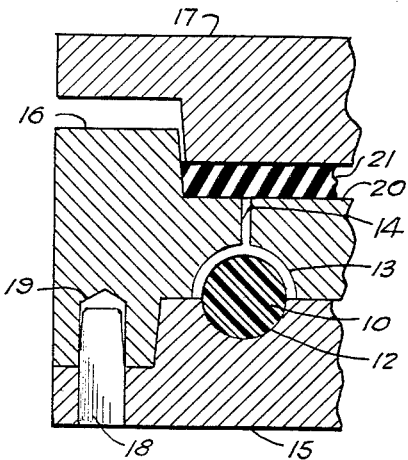
Fig. I
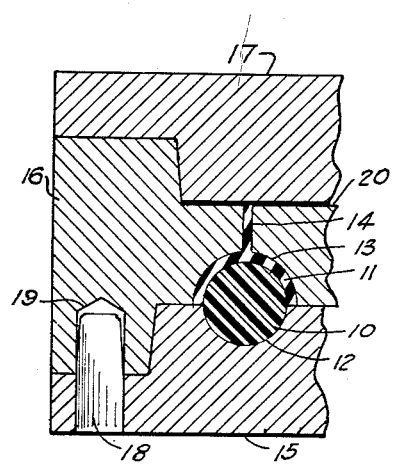
Fig. II
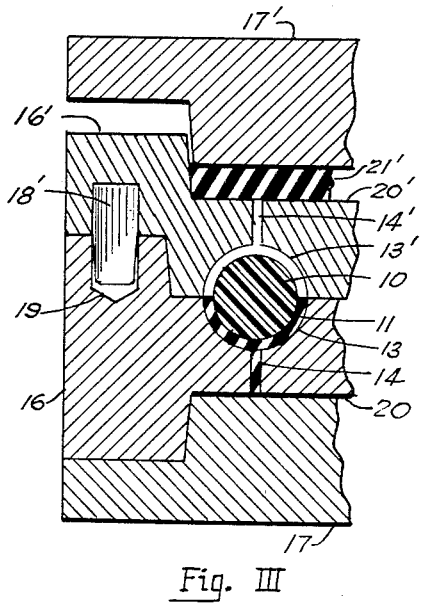
Fig. III
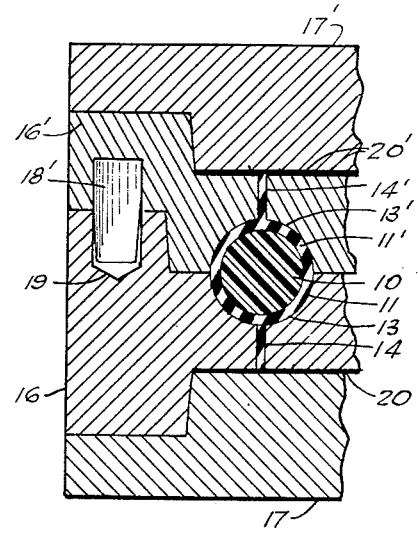
Fig. IV

Hulie E. Bowerman and Glen H. Harris, both of P.O. Box 152, Arlington, Tex.

Filed May 14, 1958, Ser. No. 735,314

1 Claim. (Cl. 18—59)

This invention relates to the manufacture of balls whereby a core such as plastic, nylon, metal, previously cured rubber, or the like, is covered with a resilient material, such as natural or synthetic rubber. Balls of this type may be used in various applications as a seal or shut-off for perforations in well casings during fracing operations, as a seal for ball type valves and other similar purposes wherein it is desirable to have a core of rigid material capable of resisting great pressures yet having a resilient outer coat which readily adapts itself to ununiform surfaces whereby superior sealing contacts are made and maintained.

Heretofore the manufacture of covered balls has been accomplished by such methods as cutting or stamping out pieces of the resilient material, forming these pieces around the core and then placing these preformed parts into the mold cavity for curing. This results in a complicated procedure; also, by this method, it is practically impossible to maintain the core concentric with the outside covering.

One of the objects of this invention is to provide an improved method of manufacturing balls having a core and a resilient covering concentric with each other which enables me to produce a superior quality of ball with uniform and predetermined thickness of resilient covering as desired.

It is yet a further object of this invention to provide for the manufacture of balls whereby a much improved adhesion or bond is obtained between the core and the resilient covering.

It is still a further object of this invention to provide for the manufacture of balls as described above whereby the core and covering are maintained concentric with each other.

A more specific object of this invention is to provide a method of manufacturing balls described above wherein the resilient material is injected into a cavity while the core is held in the exact desired position.

The invention can readily be understood by those skilled in the art from the following description together with the accompanying drawings wherein:

Figure I is a section of a plate provided with a cavity for holding a core and one part of a mating mold part with cavity to receive the plastic covering for one side of the core.

Figure II is a section similar to Figure I with plastic coating in place on the core.

Figure III shows the matching mold part of Figure I now acting as the holding plate with a second mating mold element in place embracing the uncovered section of the core.

Figure IV shows the forming operation now completed ready for curing.

In the several figures, similar elements are designated by like references wherein 10 is the core of the ball; 11 is a resilient covering; 12 is a hemispherical cavity to receive the core; 13 is a hemispherical cavity to form the finished diameter of the ball; 14 is an injection or sprue hole; 15 is a metal plate embracing the cavities 12; 16 is a metal plate embracing the cavities 13 on one face and having a space 20 provided in the opposite face to receive the uncured resilient material 21 prior to its transfer into cavities 13; 17 is a metal plate which forms a ram to inject the resilient material into cavities 13; 18 is a dowel to effect matching of the cavity halves; and 19 is a mating opening to receive dowel 18.

In manufacturing balls as described above, we preferably proceed as follows:

We first prepare the cores 10 for bonding of the resilient material, which generally consists of first sand-blasting or buffing the core and then treating it with proper bonding cements.

The cores 10, after having been prepared as described above, are placed in cavities 12 of holding plate 15. Plate 16 is then placed above plate 15, and is brought to correct register by dowel 18 being introduced into opening 19. The proper amount of uncured resilient material 21 is placed in space 20 of plate 16, and ram 17 superimposed upon material 21, as shown in Figure I.

The mold thus assembled may be placed within a suitable curing mechanism (not shown) such as between two platens of a press which may be heated by steam, electricity or the like. Pressure is then applied externally upon the mold plates as by closing the press, which in turn closes the mold and forces the resilient material 21 through sprue holes 14 into the hemispherical cavities 13 until cavities 13 are completely filled, as shown in Figure II. At this point, I may leave the mold in the curing mechanism until the one-half of the covering thus formed is completely cured. However, preferably, I remove the mold from the curing mechanism as soon as the hemispherical cavities 13 are filled, invert the mold, and remove and set aside plate 15. Plate 15 is replaced by plate 16' which is brought to correct register by dowel 18'.

As before for the first half, a proper amount of uncured resilient material 21' is placed in space 20' of plate 16' and ram 17' superimposed upon material 21', as shown in Figure III.

The mold thus assembled is placed within the curing mechanism, pressure applied externally, closing the mold and forcing resilient material 21' through sprue holes 14' into hemispherical cavities 13' until cavities 13' are completely filled. In this state, the mold as shown in Figure IV, is left in the curing mechanism until the covering 11 is completely cured.

From the above description, it is apparent that both halves of the covering go through the curing process simultaneously by my preferred method of manufacture. This results in a more uniform outer covering and a more positive bond to the core, and a uniform predetermined thickness of resilient material is permanently affixed to the core.

While we have shown a convenient and preferred method of introducing the requisite quantity of the uncured plastic or rubber-like material into cavities 13—13', other methods might also be used such as introducing a proper quantity of the material into these cavities before the molds were brought into mating registry and all such are intended to come within the following claim.

What we claim is:

The method of manufacturing balls by coating a preformed core with a curable resilient material, including the steps of supporting approximately one half of the core in a holding plate having a cavity for snugly receiving the core; enclosing the other half of the core with a first mold section continuously connected with a first space containing curable material; filling the first mold section with material under pressure from said first space; removing said holding plate; enclosing the exposed half of the core with a second mold section mating with the first section and connected with a second space containing curable material; filling the second mold section with material under pressure from said second space while simultaneously and equally pressurizing the material in both spaces; and curing the material in the mold sections.

References Cited in the file of this patent
UNITED STATES PATENTS
1,939,894   Goodwin _____ Dec. 19, 1933